(12) United States Patent  (10) Patent No.: US 7,761,470 B2
Yokokura  (45) Date of Patent: Jul. 20, 2010

(54) INFORMATION PROCESSING METHOD, INFORMATION PROCESSING PROGRAM, AND INFORMATION PROCESSING APPARATUS

(75) Inventor: Hidenori Yokokura, Kanagawa (JP)

(73) Assignee: Canon Kabushiki Kaisha (JP)

( * ) Notice: Subject to any disclaimer, the term of this patent is extended or adjusted under 35 U.S.C. 154(b) by 557 days.

(21) Appl. No.: 10/913,969

(22) Filed: Aug. 6, 2004

(65) Prior Publication Data
US 2006/0031186 A1  Feb. 9, 2006

(30) Foreign Application Priority Data
Aug. 6, 2003  (JP)  ............... 2003-206273

(51) Int. Cl.
*G06F 7/00* (2006.01)
*G06F 12/00* (2006.01)
(52) U.S. Cl. .................. 707/783; 707/827
(58) Field of Classification Search .......... 707/203; 714/5, 6; 711/161, 162
See application file for complete search history.

(56) References Cited

U.S. PATENT DOCUMENTS

| 5,260,945 | A  | * | 11/1993 | Rodeheffer | ........ | 714/4 |
| 6,397,265 | B1 |   | 5/2002  | Iwamoto    | ........ | 710/1 |
| 2002/0048476 | A1 |   | 4/2002 | Kato | ........ | 400/70 |
| 2002/0053009 | A1 | * | 5/2002 | Selkirk et al. | ........ | 711/162 |
| 2002/0154335 | A1 |   | 10/2002 | Matoba et al. | ........ | 358/1.15 |
| 2003/0023538 | A1 | * | 1/2003 | Das et al. | ........ | 705/37 |
| 2003/0076524 | A1 |   | 4/2003 | Wanda | ........ | 358/1.14 |

FOREIGN PATENT DOCUMENTS

JP    2002-109248 A    4/2002

OTHER PUBLICATIONS

Bellwood, UDDI Version 2.04 API Specification, UDDI Committee Specification, Jul. 19, 2002 (http://uddi.org/pubs/ProgrammersAPI_v2.htm).*

* cited by examiner

*Primary Examiner*—John R. Cottingham
*Assistant Examiner*—Nirav K Khakhar
(74) *Attorney, Agent, or Firm*—Rossi, Kimms & McDowell LLP

(57) ABSTRACT

An information processing method which can reduce stress on the user by always providing services to the user without any delay. The information processing method is executed by an information processing apparatus. A search server is requested to perform a search for at least one of servers for performing desired data processing, and a result of the search showing a first server is received from the search server. The search server is requested to perform a search for at least one of the servers for performing the desired data processing, and a result of the search showing a second server which is different from the first server is received from the search server, when the first server cannot accept a request for performing the desired data processing from the information processing apparatus. The second server is registered in a storage as a substitute server for the first server. The substitute server is requested to perform the desired data processing without requesting the search server to perform the search for at least one of the servers for performing the desired data processing, when the first server cannot accept the request from the information processing apparatus, and the substitute server is registered in the storage.

12 Claims, 9 Drawing Sheets

FIG. 5

| SERVER NAME | SERVICE NAME | URL | SERVICE CHARGE |
|---|---|---|---|
| SERVER 14 | IMAGE EDITING | http://svra.co.jp/ | 150 YEN/HR |

61  62  63  64

INFORMATION PROCESSING METHOD, INFORMATION PROCESSING PROGRAM, AND INFORMATION PROCESSING APPARATUS

BACKGROUND OF THE INVENTION

1. Field of the Invention

The present invention relates to an information processing method, an information processing program, and an information processing apparatus, which are applied to a network to which a computer and a printer, i.e. an information processing apparatus, both having a server function or a client function, are connected.

2. Description of the Related Art

In recent years, image editing services have been provided where downloaded images are further subjected to image editing and then printed. These downloaded images, which are downloaded to information terminals, are images made public or registered on the Internet or an intranet, or digital images that a user has taken and then uploaded onto a web (the World Wide Web) (web).

The information terminals which use such image editing services not only use applications already provided in these information terminals, but access a server that has a variety of services including image editing services and image management services, to receive desired services from the server, to thereby provide a variety of versatile image editing services for the users (refer to Japanese Laid-Open Publication (Kokai) No. 2002-109248, for example).

Also, it is expected that these image editing services will increasingly gain popularity in the future.

However, when the above information terminals access a desired server (hereinafter referred to as "the target server") to receive and use such an image editing service from the target server, if the target server is undergoing system failure or maintenance, the image editing service cannot be used, which can cause stress on the user.

To eliminate this inconvenience, it can be envisaged that when the target server is undergoing system failure or maintenance, another server that can be used as a substitute of the target server is searched to use the same. However, if a search for another server is carried out each time the target server is undergoing system failure or maintenance, it will take a long time period until the image editing service can be used, and hence the user will feel greater stress each time this search is carried out.

SUMMARY OF THE INVENTION

It is an object of the present invention to provide an information processing method, an information processing program, and an information processing apparatus which can reduce stress on the user by always providing services to the user without any delay.

To attain the above object, in a first aspect of the present invention, there is provided an information processing method executed by at least one information processing apparatus, the information processing apparatus being provided with a storage and being connected to a network system which has a plurality of servers and at least one search server, comprising a first receiving step of requesting the search server to perform a search for at least one of the servers for performing desired data processing, and receiving a result of the search showing a first server from the search server, a second receiving step of requesting the search server to perform a search for at least one of the servers for performing the desired data processing, and receiving a result of the search showing a second server which is different from the first server from the search server, when the first server cannot accept a request for performing the desired data processing from the information processing apparatus, a registering step of registering the second server in the storage as a substitute server for the first server, and a data processing requesting step of requesting the substitute server to perform the desired data processing without requesting the search server to perform the search for at least one of the servers for performing the desired data processing, when the first server cannot accept the request from the information processing apparatus, and the substitute server is registered in the storage.

According to the first aspect of the present invention, the substitute server is requested to perform the desired data processing without requesting the search server to perform the search for at least one of the servers for performing the desired data processing, when the first server cannot accept the request from the information processing apparatus, and the substitute server is registered in the storage. Therefore, it is possible to reduce stress on the user by always providing services to the user without any delay.

To attain the above object, in a second aspect of the present invention, there is provided an information processing method executed by at least one information processing apparatus, the information processing apparatus being provided with a storage and being connected to a network system which has a plurality of servers and at least one search server, comprising an output step of outputting an instruction to perform a search for at least one of the servers for performing desired data processing, to the search server, a receiving step of receiving a result of the search responsive to the instruction to perform the search and showing a first server from the search server, a first enquiry executing step of executing an inquiry to the first server to make a request for performing the desired data processing, a second inquiry executing step of executing an inquiry to a second server which is different from the first server to make a request for performing the desired data processing, when the first server cannot accept the request, a registering step of registering the second server in the storage as a substitute server for the first server, when the second server accepts the request, a data processing requesting step of requesting the substitute server to perform the desired data processing without outputting the instruction to perform the search to the search server in the output step, when the first server cannot accept the request, and the substitute server is registered in the storage.

According to the second aspect of the present invention, the same effects can be obtained as in the first aspect of the present invention.

Preferably, in the information processing method according to the first aspect, the registering step comprises registering a number of times the first server rejects the request and an identifier which specifies the first server in association with each other in the storage, and registering the first server as an inquiry-excluded server in the storage when the number of times is not less than a predetermined number of times, and the data processing requesting step comprises requesting the substitute server to perform the desired data processing, when the first server is registered in the storage as the inquiry-excluded server.

Further preferably, in the information processing method according to the second aspect, the registering step comprises registering a number of times the first server rejects the request and an identifier which specifies the first server in association with each other in the storage, and registering the first server as an inquiry-excluded server in the storage when the number of times is not less than a predetermined number of times, and the data processing requesting step comprises requesting the substitute server to perform the desired data processing, when the first server is registered in the storage as the inquiry-excluded server.

Preferably, in the information processing method according to the first aspect, the registering step comprises registering the second server as the substitute server when a use charge for a service of the second server for performing the desired data processing is not more than a predetermined upper limit.

Further preferably, in the information processing method according to the second aspect, the registering step comprises registering the second server as the substitute server when a use charge for a service of the second server for performing the desired data processing is not more than a predetermined upper limit.

To attain the above object, in a third aspect of the present invention, there is provided an information processing program executed by at least one information processing apparatus, the information processing apparatus being provided with a storage and being connected to a network system which has a plurality of servers and at least one search server, comprising a first receiving module for requesting the search server to perform a search for at least one of the servers for performing desired data processing, and receiving a result of the search showing a first server from the search server, a second receiving module for requesting the search server to perform a search for at least one of the servers for performing the desired data processing, and receiving a result of the search showing a second server which is different from the first server from the search server, when the first server cannot accept a request for performing the desired data processing from the information processing apparatus, a registering module for registering the second server in the storage as a substitute server for the first server, and a data processing requesting module for requesting the substitute server to perform the desired data processing without requesting the search server to perform the search for at least one of the servers for performing the desired data processing, when the first server cannot accept the request from the information processing apparatus, and the substitute server is registered in the storage.

According to the third aspect of the present invention, the same effects can be obtained as in the first aspect of the present invention.

To attain the above object, in a fourth aspect of the present invention, there is provided an information processing program executed by at least one information processing apparatus, the information processing apparatus being provided with a storage and being connected to a network system which has a plurality of servers and at least one search server, comprising an output module for outputting an instruction to perform a search for at least one of the servers for performing desired data processing, to the search server, a receiving module for receiving a result of the search responsive to the instruction to perform the search and showing a first server from the search server, a first inquiry executing module for executing an inquiry to the first server to make a request for performing the desired data processing, a second inquiry executing module for executing an inquiry to a second server which is different from the first server to make a request for performing the desired data processing, when the first server cannot accept the request, a registering module for registering the second server in the storage as a substitute server for the first server, when the second server accepts the request, a data processing requesting module for requesting the substitute server to perform the desired data processing without outputting the instruction to perform the search to the search server by the output module, when the first server cannot accept the request, and the substitute server is registered in the storage.

Preferably, in the information processing program according to the third aspect, the registering module comprises registering a number of times the first server rejects the request and an identifier which specifies the first server in association with each other in the storage, and registering the first server as an inquiry-excluded server in the storage when the number of times is not less than a predetermined number of times, and the data processing requesting module comprises requesting the substitute server to perform the desired data processing, when the first server is registered in the storage as the inquiry-excluded server.

Further preferably, in the information processing program according to the fourth aspect, the registering module comprises registering a number of times the first server rejects the request and an identifier which specifies the first server in association with each other in the storage, and registering the first server as an inquiry-excluded server in the storage when the number of times is not less than a predetermined number of times, and the data processing requesting module comprises requesting the substitute server to perform the desired data processing, when the first server is registered in the storage as the inquiry-excluded server.

Preferably, in the information processing program according to the third aspect, the registering module comprises registering the second server as the substitute server when a use charge for a service of the second server for performing the desired data processing is not more than a predetermined upper limit.

Further preferably, in the information processing program according to the fourth aspect, the registering module comprises registering the second server as the substitute server when a use charge for a service of the second server for performing the desired data processing is not more than a predetermined upper limit.

To attain the above object, in a fifth aspect of the present invention, there is provided an information processing apparatus which is capable of communicating with a plurality of servers and at least one search server, comprising a storage, a first receiving device that requests the search server to perform a search for at least one of the servers for performing desired data processing, and receives a result of the search showing a first server from the search server, a second receiving device that requests the search server to perform a search for at least one of the servers for performing the desired data processing, and receives a result of the search showing a second server which is different from the first server from the search server, when the first server cannot accept a request for performing the desired data processing from the information processing apparatus, a registering device that registers the second server in the storage as a substitute server for the first server, and a data processing requesting device that requests the substitute server to perform the desired data processing without requesting the search server to perform the search for the at least one of the servers for performing the desired data processing, when the first server cannot accept the request from the information processing apparatus, and the substitute server is registered in the storage.

According to the fifth aspect of the present invention, the same effects can be obtained as in the first aspect of the present invention.

To attain the above object, in a sixth aspect of the present invention, there is provided an information processing apparatus which is capable of communicating with a plurality of servers and at least one search server, comprising a storage, an output device that outputs an instruction to perform a search for at least one of the servers for performing desired data processing, to the search server, a receiving device that receives a result of the search responsive to the instruction to perform the search and showing a first server from the search server, a first inquiry executing device that executes an inquiry to the first server to make a request for performing the desired data processing, a second inquiry executing device that executes an inquiry to a second server which is different from the first server to make a request for performing the desired data processing, when the first server cannot accept the request, a registering device that registers the second server in the storage as a substitute server for the first server, when the second server accepts the request, a data processing requesting device that requests the substitute server to perform the desired data processing without outputting the instruction to perform the search to the search server by the output device, when the first server cannot accept the request, and the substitute server is registered in the storage.

According to the sixth aspect of the present invention, the same effects can be obtained as in the first aspect of the present invention.

The above and other objects, features, and advantages of the invention will become more apparent from the following detailed description taken in conjunction with the accompanying drawings.

BRIEF DESCRIPTION OF THE DRAWINGS

FIG. 5 is a diagram showing an example of information of a secondary server registered in a RAM of the printer;

DETAILED DESCRIPTION OF THE PREFERRED EMBODIMENTS

Figure 1:
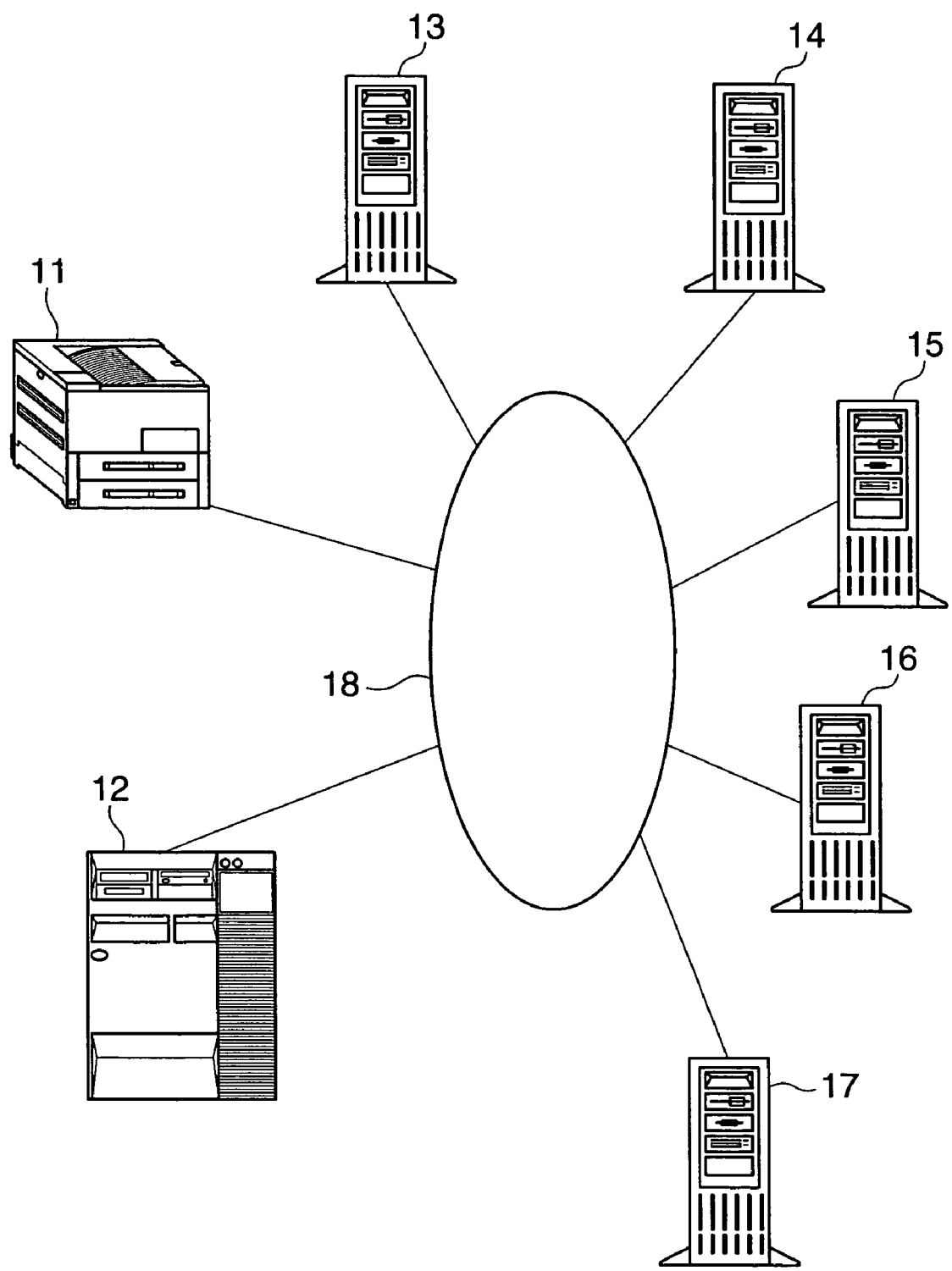
FIG. 1 is a diagram showing the whole construction of a network system applicable to an information processing method according to an embodiment of the present invention.

The present invention will now be described in detail with reference to the drawings showing a preferred embodiment thereof. In the drawings, elements and parts which are identical throughout the views are designated by identical reference numerals, and duplicate thereof is omitted.

FIG. 1 is a diagram showing the whole construction of a network system applicable to an information processing method according to an embodiment of the present invention.

The network system in FIG. 1 is comprised of a printer 11, as an information processing apparatus, a search server 12 for searching for a predetermined server from a plurality of servers, servers 13 to 18 which are provided with various functions, and a network 18. The printer 11, the search server 12 and the servers 13 to 17 are connected to each other via the network 18.

The printer 11 is connected directly to the network 18, and as a HTTP client, can perform an inquiry to the search server 12 as to a server which provides an image editing service or the like. Furthermore, the printer 11 is capable of value added printing. The search server 12 and servers 13 to 17 are each implemented by a personal computer, for example. The search server 12 receives an inquiry from the printer 11 and notifies the printer 11 of a server which matches the contents of the inquiry. The servers 13 to 17, for example, carry out an image editing service and notify the search server 12 that the image editing service is available. The search server 12 receives the notification from the servers 13 to 17, and registers the uniform resource locators (URLs) of the servers 13 to 17 in a data base or the like, not shown, provided in the search server 12. The network 18 is a local area network (LAN) or an intranet.

The number of search servers, servers, and printers connected to the network 8 to carry out the image editing service may be different to the number shown in FIG. 1. Also, in the network system in FIG. 1, not only an image editing service but also a service relating to added value printing of image data may be carried out.

Figure 2:
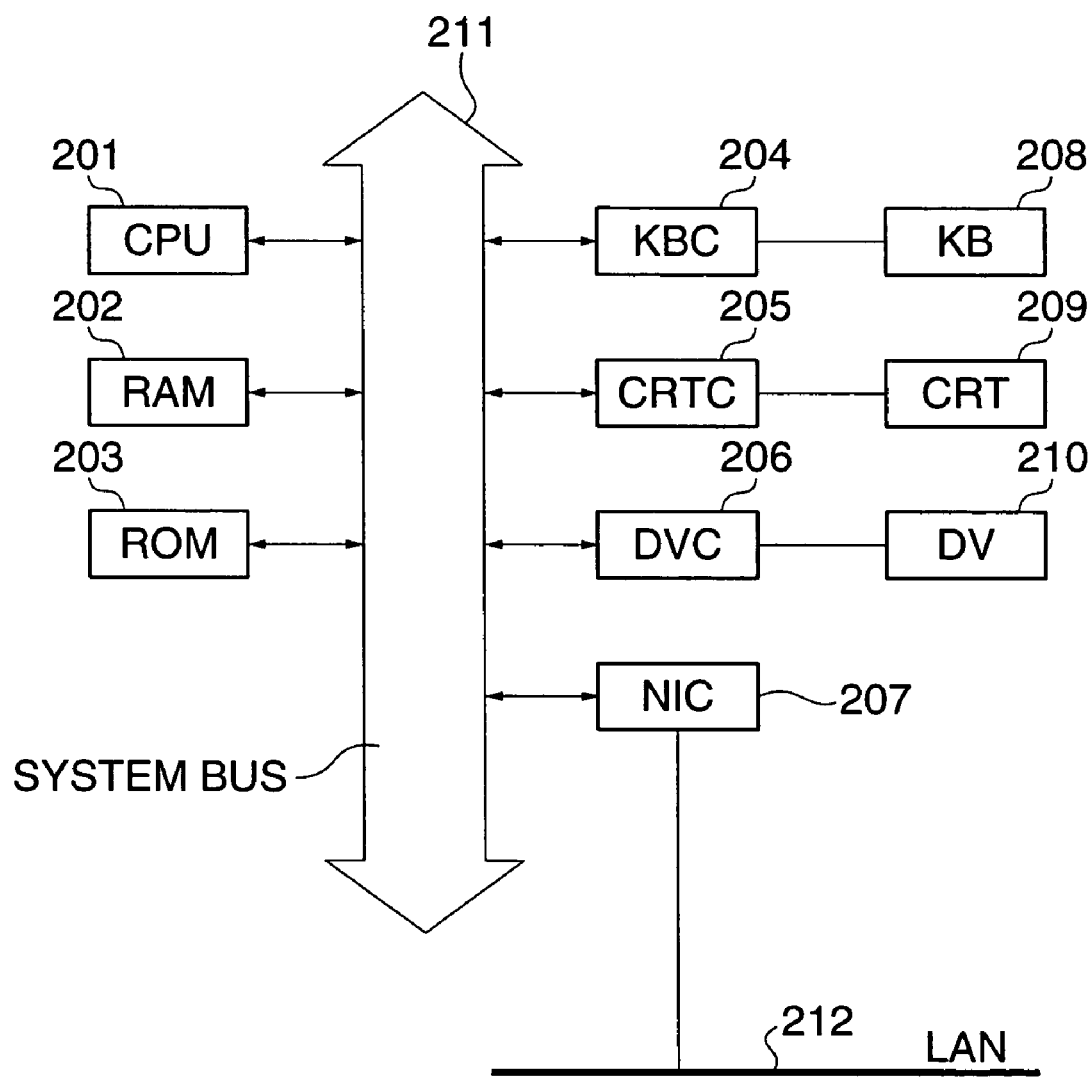
FIG. 2 is a diagram showing the internal construction of a printer appearing in FIG. 1.

FIG. 2 is a diagram showing the internal construction of the printer 11 in FIG. 1.

The printer 11 can print image data and the like received from clients, not shown, via the network 18 in FIG. 1 or from the servers 13 to 17 in FIG. 1.

The printer 11 is provided with a CPU 201 for carrying out programs stored in a ROM 203, and centrally controls devices connected to a system bus 211. Connected to the system bus 211 are the CPU 201, a RAM 202, the ROM 203, a keyboard controller (KBC) 204, a CRT controller (CRTC) 205, a device controller (DVC) 206, and a network interface guide (NIC) 207. A keyboard 208 is connected to the KBC 204, a CRT display is connected to the CRTC 205, and further a device (DV) 210, such as a printer, is connected to the DVC 206.

The RAM 202 functions as a main memory, or a work area and the like for the CPU 201, and also has a function as a backup RAM for storing information of a server or servers which request a service. In particular, the RAM 202 stores the URLs of inquiry-excluded server(s), described later, the URL of a secondary server, and the like. The inquiry-excluded server is, for example, a server which does not send a response to a connection request from the printer 11. In other words, the inquiry-excluded server is a server which is temporarily not connected to the network because of system failure, maintenance, or the like.

The KBC 204 controls instructions input from the KB 208, and the CRT 205 controls the display of the CRT 209. The user uses the KB 208 and the CRT 209 to carry out processes such as the editing of image data, and can perform printing of the image data that has been processed. The DVC 206 controls the DV 210 such as a printer. The NIC 207 interactively communicates data with other network devices or other PCs via the LAN.

The LAN 212 is the same as the LAN 208 in FIG. 1.

The information of a server or servers which request a service can be stored in a storage, not shown, such as a hard disk. Also, a virtual keyboard that enables a key input may be displayed on a liquid crystal touch panel or the like, and the virtual keyboard may be used instead of the keyboard 208.

Next, how the printer 11 inquires of the search server 12 will be described.

The printer 11 sends to the search server 12 a request to carry out a search for servers that can provide a contents offering service, using the Hypertext Transfer Protocol (HTTP). Upon receipt of the request, the search server 12 carries out a search for servers that can provide the contents offering service, through the database provided in the search server 12, and as the results of the search, sends to the printer 11 a list of the servers that can provide the contents offering service, and the URLs of these servers. As a result, the printer 11 acquires the list of the servers that can provide the contents offering server, and the URLs of these servers.

The HTTP is used as a communication protocol for the communication between the printer 11 and the server 12, as mentioned above. However, if a communication protocol to be used for communication between the printer 11 and the server 12 is determined in advance, the type of protocol to be used is not particularly limited to the HTTP. Also, in the present embodiment, URLs are used for identifying the servers but any other identifier can be used for identifying the servers, such as IP addresses.

Figure 3:
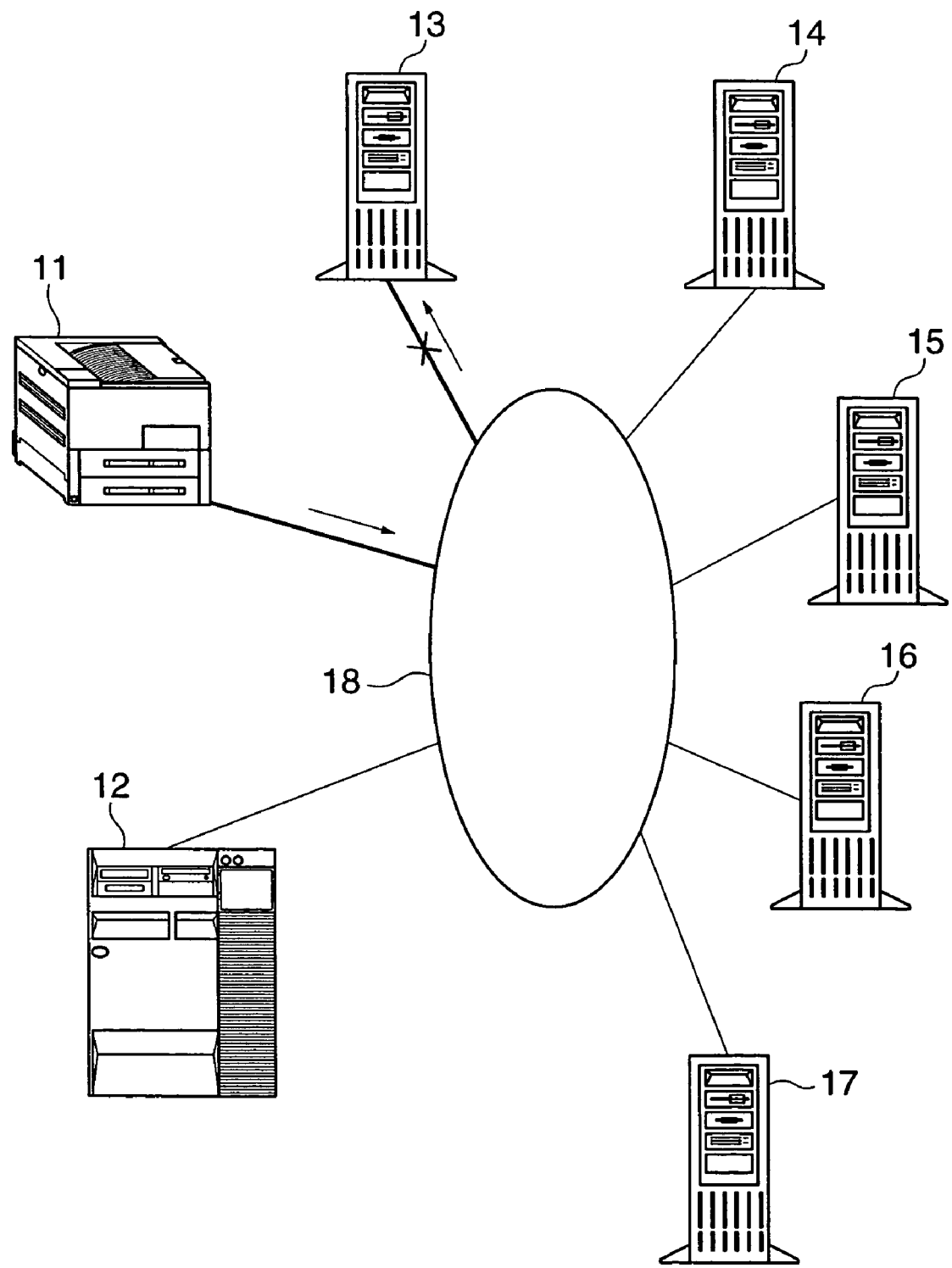
FIG. 3 is a diagram schematically showing a state where the printer carries out a first inquiry to a server performing an image editing service.

FIG. 3 is a diagram schematically showing a state when the printer 11 carries out a first inquiry to a server performing the image editing service.

Before carrying out the first inquiry to the server which will carry out the image editing service, the printer 11 acquires from the search server 12 the list of the servers that can provide the image editing service as well as the respective URLs of these servers. For example, the list of the servers that can provide the image editing service includes the servers 13 to 17 and, as the URLs of these servers has respectively, "http://gazou.canon.co.jp/", "http://svra.co.jp/", "http://svrb-.com/", "http://sa-ba.co.jp/", and "http://eee.co.jp/".

The printer 11 confirms whether or not the received respective URLs of the servers 13 to 17 that can provide the image editing service are registered as the URLs of the inquiry-excluded servers stored in the RAM 202 in the order of listing in the list.

In the state of FIG. 3, the respective URLs of the servers 13 to 17 are not registered as inquiry-excluded servers because the printer 11 carries out the first inquiry to the server that can provide the image editing service. Accordingly, first, the printer 11 requests the server 13, that is listed at the top of the list, to provide the image editing service. However, it is assumed that the server 13 cannot then receive the connection request because of system failure, maintenance, or the like.

The HTTP is used for the communication between the printer 11 and each of the servers 13 to 17. However, if a communication protocol to be used for communication between the printer 11 and each of the servers 13 to 17, the type of protocol to be used is not particularly limited to the HTTP.

Figure 4:
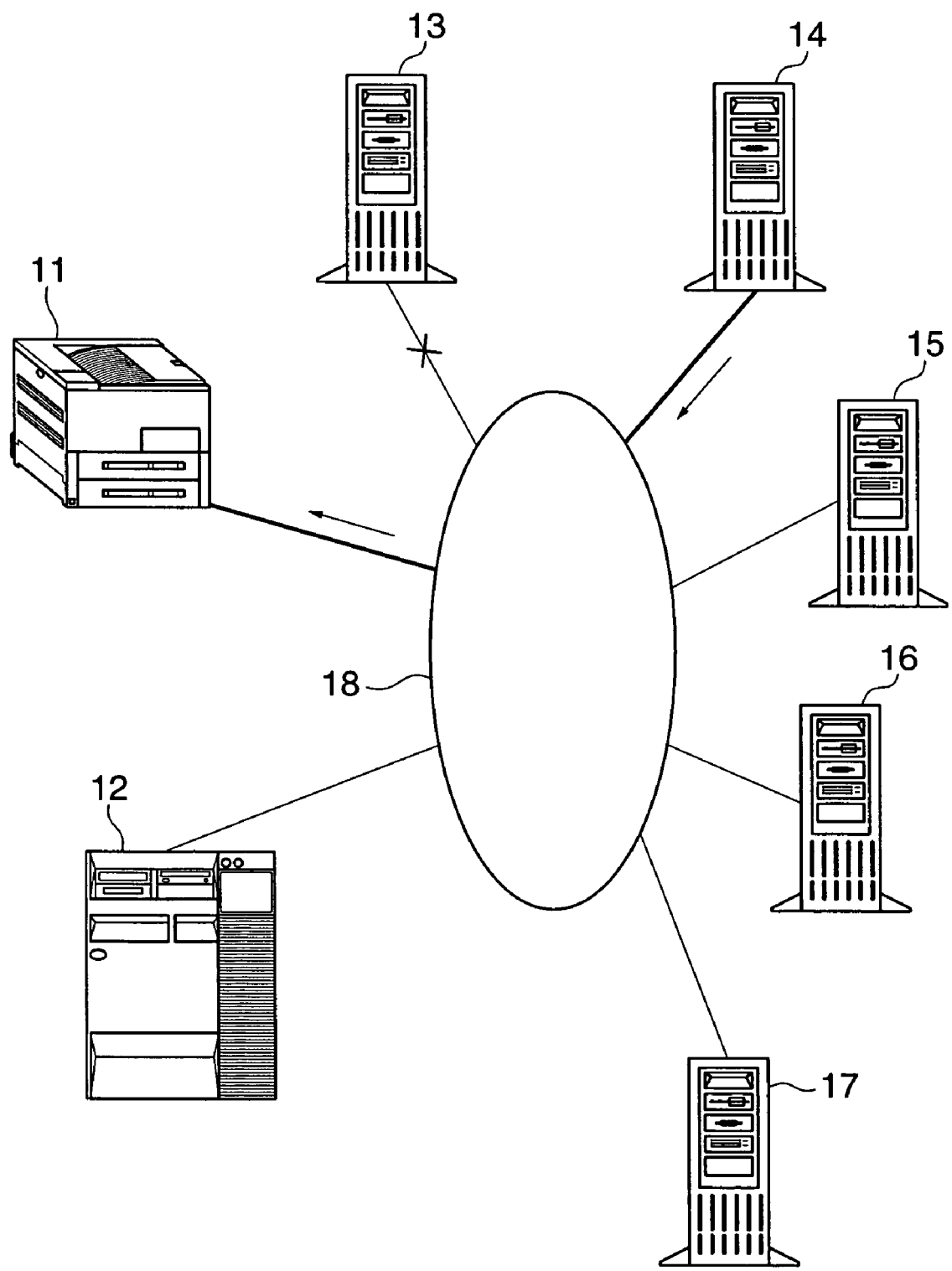
FIG. 4 is a diagram schematically showing a state where the printer receives the image editing service from the server.

FIG. 4 is a diagram schematically showing a state when the printer 11 receives the image editing service from the server 14.

As mentioned above, the printer 11 makes a connection request to the secondary server (a server to be inquired of when access cannot be made to the intended server) registered in the RAM 202 because the server 13 is in a state where it cannot accept the connection request. In this case, the secondary server is not registered in the RAM 202 because it is immediately after the first inquiry to the server which provides the image editing service.

Therefore, the printer 11 once again makes an inquiry to the search server 12 and requests the server 14, the second server on the list acquired from the search server 12 to provide the image editing service. The server 14 accepts the request for provision of the image editing service and sends information (for example, 150 yen/hr) on the charge for using the image editing service to the printer 11. The printer 11 receives the information on the charge for using the image editing service from the server 14, and then determines whether or not this use charge is cheaper than an upper limit (for example, 200 yen/hr) registered in advance in the RAM 202 for the image editing service. If it is determined that the use charge is cheaper than the upper limit, the printer 11 receives provision of the image editing service from the server 14 and registers the use charge of the image editing service provided by the server 14 and the URL of the server 14 in the RAM 202 as a secondary server. On the other hand, if the use charge is more expensive than the upper limit, the printer 11 does not receive provision of the image editing service from the server 14, and the process is terminated. Alternatively, the printer 11 once again makes an inquiry to the search server 12 and requests the server 15, the third server on the list acquired from the search server 12, and the same process as described above is repeated. FIG. 4 shows the state of the printer 11 receiving the image editing service from the server 14 when the use charge of the image editing service provided by the server 14 is cheaper than the upper limit registered in the RAM 202.

The upper limit of the use charge of the image editing service registered in the RAM 202 may be an amount other than the above-mentioned amount (i.e., 200 yen/hr). Further, a user may set the upper limit of the use charge of the image editing service to the printer 11. Also, any server that is listed as accepting a request for provision of the image editing service may be registered as the secondary server, regardless of the use charge for the image editing service provided by the server.

FIG. 5 is a diagram showing an example of information of a secondary server registered in the printer 11.

This information of the secondary server is comprised of a server name 61, a service name 62, a URL 63 as an access point of the secondary server, and a service charge 64, which is notified when an inquiry is made to the secondary server. In the example of FIG. 5, the server name 61 is "server 14", the service name 62 is "image editing", the URL 63 is "http://svra.co.jp/", and the use charge 64 is "150 yen/hr".

In the present embodiment, the type of the service is limited to the image editing service, but other services may be registered in the RAM 202 on service-by-service basis, so that the printer 11 can use services that have been registered. Although the information of the secondary server is comprised of the server name 61, the service name 62, the URL 63, and the service charge 64, information of items other than these may be included.

Figure 6:
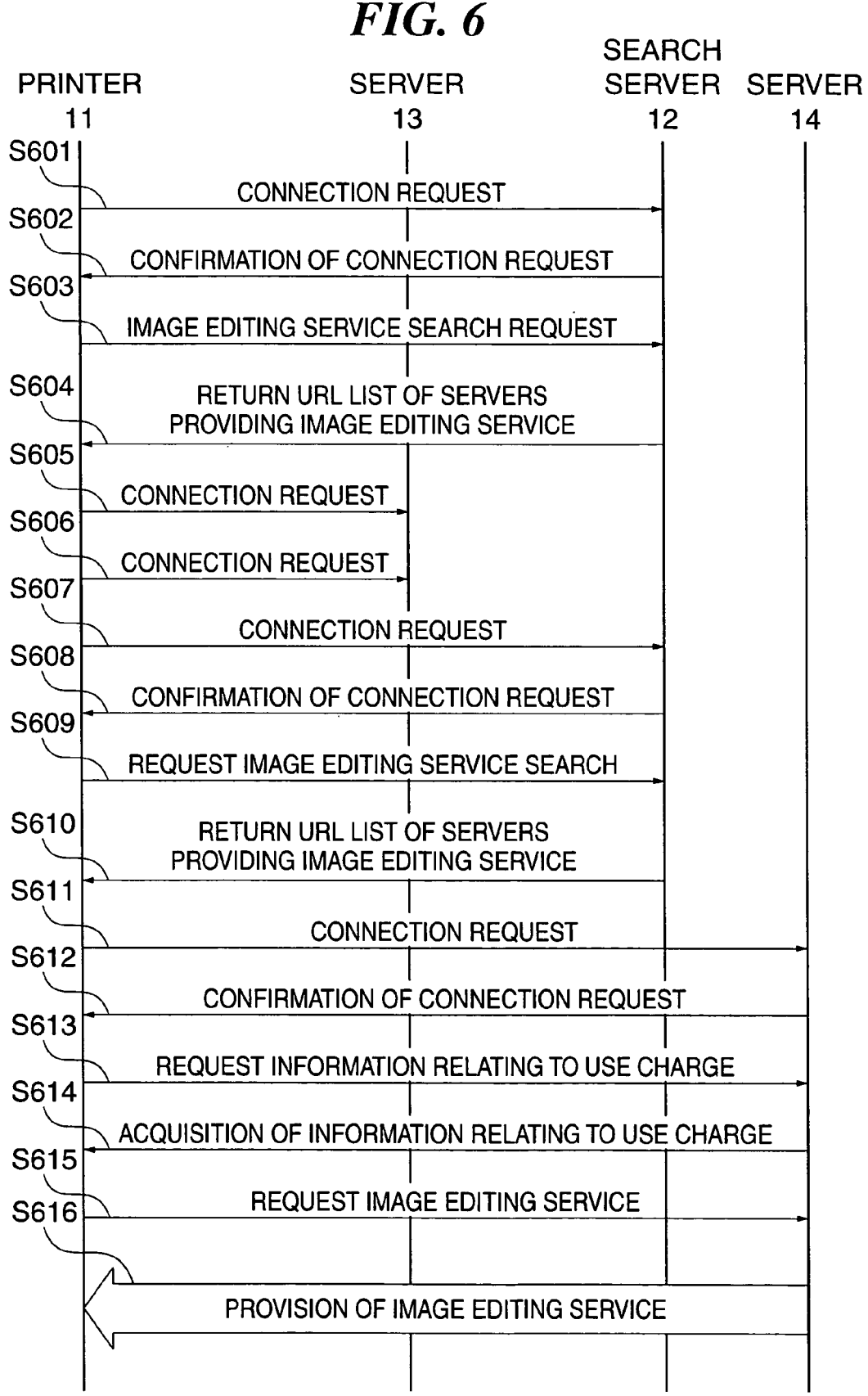
FIG. 6 is a diagram showing a processing sequence carried out by the printer forming a part of the network system having the printer in order for the printer to use the secondary server when the secondary server is not registered in the RAM of the printer.

FIG. 6 is a diagram showing a processing sequence carried out by the printer 11 forming a part of the network system having the printer 11 in order for the printer 11 to use the secondary server when the secondary server is not registered in the RAM 202 of the printer 11.

First, when the printer 11 processes and prints an image by using the image editing service, it makes an inquiry to the search server 12. In other words, the printer 11 sends a connection request to the search server 12 (step S601), receives a confirmation of the connection request from the search server 12 (step S602), and a communication connection is established between the printer 11 and the search server 12.

After that, the printer 11 makes a search request for the image editing service to the search server 12 (step S603) and receives a list of URLs for servers that can provide the image editing service from the search server 12 (step S604).

The printer 11 sends a connection request to the server (for example, the server 13) that is listed first on this list (step S605). Here, it is assumed that the server 13 is in a state where a connection request cannot be accepted because of system failure, maintenance, or the like. Therefore, the printer 11 cannot receive a confirmation of the connection request from the server 13 and once again sends a connection request to the server 13 (step S606).

However, the printer 11 cannot receive the confirmation of the connection request from the server 13, and hence the printer 11 stops sending the connection request to the server 13. A secondary server is not registered in the RAM 202 included in the printer 11, and hence the printer 11 once again carries out processing similar to the steps S601 to S604 (steps S607 to S610) to acquire a list of URLs for servers that can provide the image editing service.

The printer 11 sends a connection request to the server (for example, the server 14) that is listed second on the list (step S611) and receives a confirmation of the connection request from the server 14 (step S612). Also, the printer 11 makes a request for information relating to the use charge of the image editing service to the server 14 (step S613), acquires the information relating to the use charge of the image editing service from server 14 (step S614), and determines whether or not this acquired use charge is cheaper than the upper limit registered in the RAM 202 for the image editing service.

When the acquired use charge of the image editing service of the server 14 is cheaper than the upper limit that is registered in the RAM 202 for the image editing service, the printer 11 makes the request for the provision of the image editing service from the server 14 (step S615), and actually receives it (step S616). At this time, the printer 11 registers the server 14 in the RAM 202 as a secondary server.

On the other hand, when the acquired use charge of the image editing service of the server 14 is more expensive than the upper limit that is registered in the RAM 202 for the image editing service, the printer 11 does not make the request for the provision of the image editing service from the server 14 and does not register the server 14 in the RAM 202 as a secondary server.

The network connection may be a TCP/IP connection or a connectionless type, such as a UDP/IP connection. Also, the protocol used by the network may be anything insofar as it can establish the connection between devices via the Internet.

Also, although in the present embodiment, when the above-mention printer 11 cannot receive confirmation of a connection request from the server 13, a connection request is sent to the server 13 (step S606) again, the number of times this connection request can be resent to the server 13 is not limited to one. The time intervals of resending the connection request to the server 13 can be set by the printer 11.

Also, after a connection has been established between the printer 11 and one of the servers (for example, the server 11), even when the response from the server (for example, the server 14) is an error for some factor, the printer 11 starts an inquiry to another server (for example, the server 15) and carries out the same processing as described above.

Figure 7:
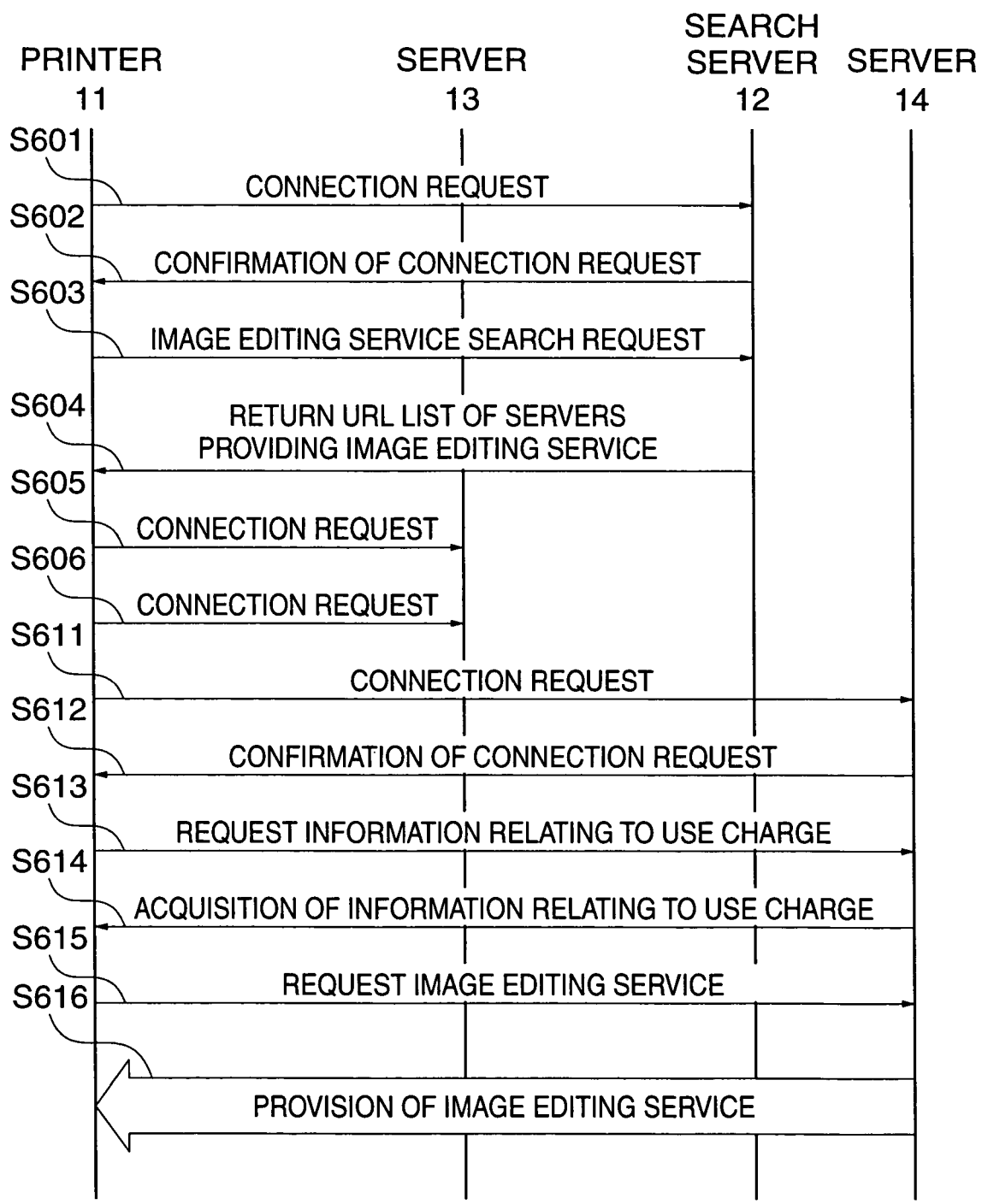
FIG. 7 is a diagram showing a processing sequence carried out by the printer forming a part of the network system having the printer in order for the printer to use the secondary server when the secondary server is registered in the RAM of the printer.

FIG. 7 is a diagram showing a processing sequence carried out by the printer 11 forming a part of the network system having the printer 11 in order for the printer 11 to use the secondary server when the secondary server is registered in the RAM 202 of the printer 11.

The sequence in FIG. 7 has the steps S607 to S608 in the sequence of FIG. 6 omitted, and the other steps are similar to those of the sequence of FIG. 6.

The steps S607 to S610 can be thus omitted because the secondary server is registered in the RAM 202 of the printer 11. In other words, when a secondary server is registered, the server 11 need not a search request for the image editing service to the search server 12, and hence the image editing service can be provided to a user without any delay, to thereby reduce the stress on the user.

Figure 8A:
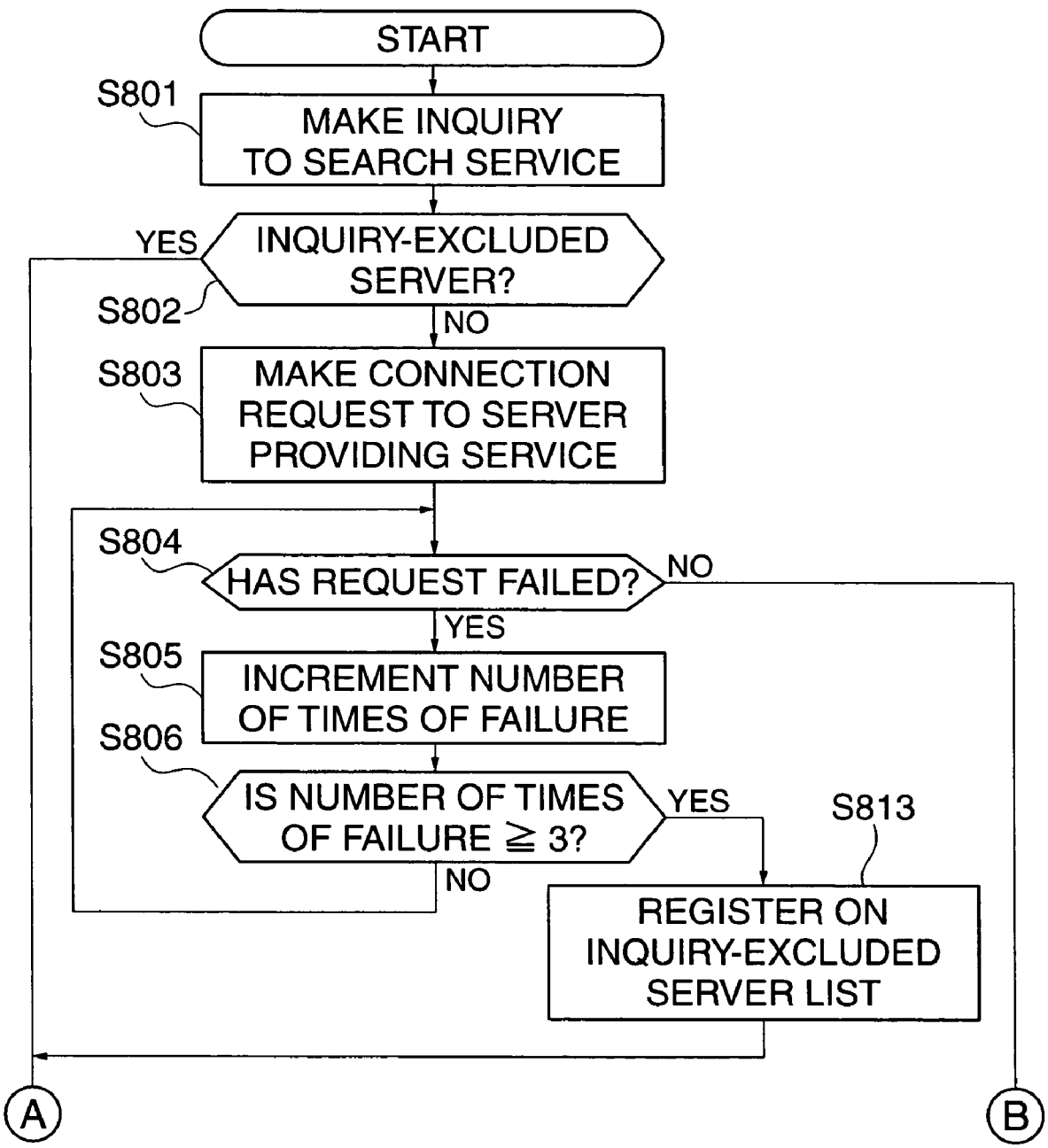
FIGS. 8A and 8B are flowchart showing a process carried out by the printer.
Figure 8B:
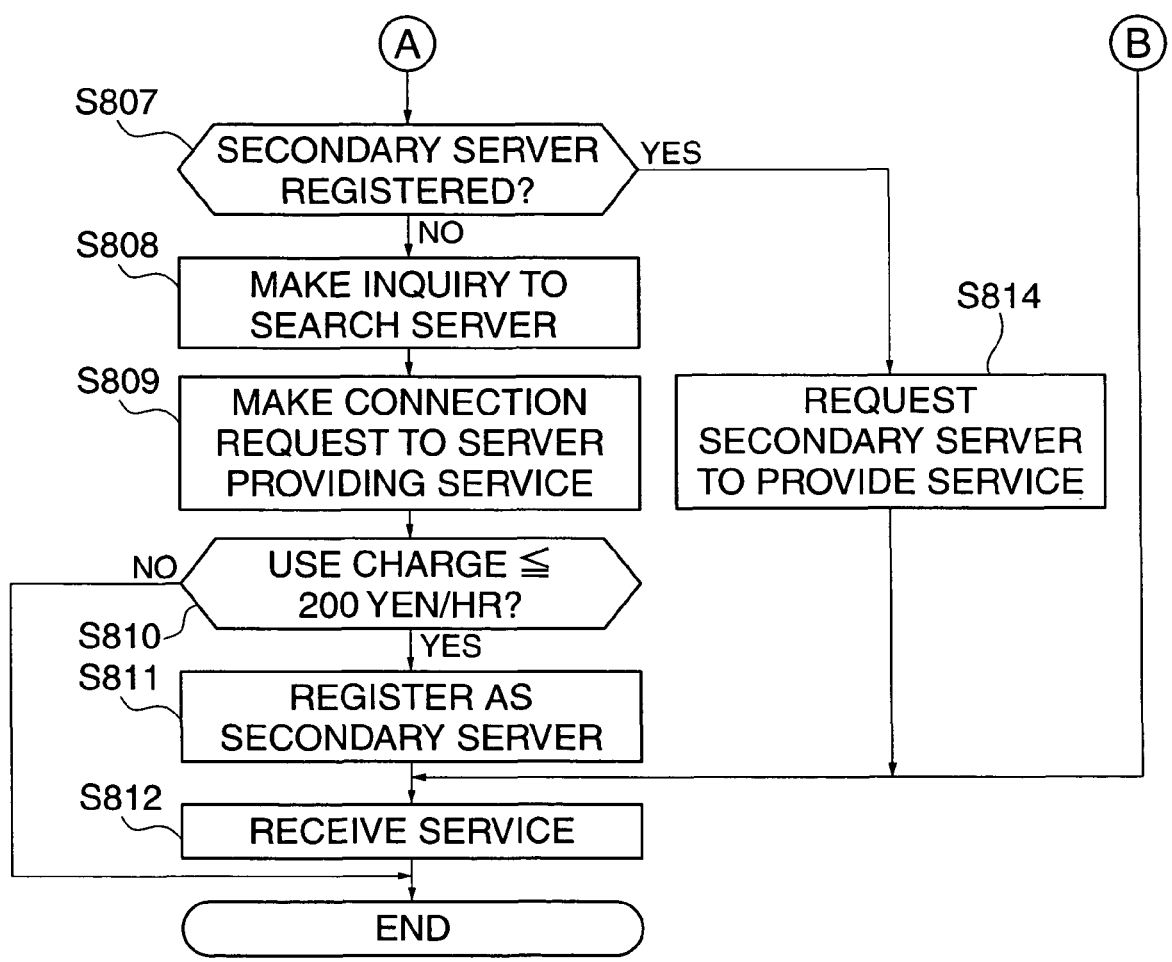

FIGS. 8A and 8B are flowchart showing a process carried out by the printer 11.

First, an inquiry is made to the search server 12 (step S801). A search for servers capable of providing the image editing service is carried out to acquire a list of the servers and URLs thereof.

Next, it is determined whether or not the URL of the server is listed first on the list acquired from the search server 12 is a URL of an inquiry-excluded server stored in the RAM 202 (step S802). When it is determined that it is the URL of the inquiry-excluded server, the process proceeds to a step S807, referred to later. On the other hand, when it is determined that it is not the URL of the inquiry-excluded server, a connection request for receiving the image editing service from the server listed first on the list is made (step S803). Then, it is determined whether or not this connection request has failed (step S804). This determination is made based on whether or not a response has been returned within a predetermined time period from the server to which the connection request was made. When the response has been returned within the predetermined time period from the server to which the connection request was made, it is determined that the connection request has succeeded, and when the response has not been returned, it is determined that the connection request has failed.

When it is determined in the step S804 that the connection request has succeeded, the image editing service is received from the server to which the connection request was made (step S812), and then the process is terminated.

On the other hand, when it is determined in the step S804 that the connection request has failed, the number of times of failure of the connection request to the server is incremented by 1 and stored in the RAM 202 (step S805).

Next, it is determined whether or not the number of times of failure of the connection request stored in the RAM 202 is not less than a predetermined value "3" as a threshold (step S806).

When it is determined in the step S806 that the number of times of failure of the connection request is less than the threshold value "3", the process returns to the step S804. On the other hand, when the number of times of failure of the connection request is not less than the threshold value "3", the URL of the server is stored in a list of inquiry-excluded servers (step S813).

Next, it is determined whether or not the URL of the secondary server has been stored in the RAM 202 (step S807). When it is determined that the URL of the secondary server has been stored in the RAM 202, a request for provision of the image editing service is made to the secondary server without inquiring of the search server 12 again (step S814) and then the process proceeds to the step S812.

If it is determined in the step S807 that the URL of the secondary server is not stored in the RAM 202, an inquiry is made to the search server 12 again (step S808), to search for servers that can provide the image editing service and acquire a list of the servers. A connection request is made to one of servers that are servers other than the servers to which the connection request has failed beforehand and which are not inquiry-excluded servers (step S809). After the connection is established in response to this connection request, it is determined whether or not the use charge returned by the server to which the connection has been made is not more than the upper limit (for example, 200 yen/hr) (step S810). When the use charge exceeds the upper limit, the process is terminated. On the other hand, when the service charge is not more than the upper limit, the server is stored in the RAM 202 as the secondary server (step S811), the image editing service is received from the server (step S812), and then the process is terminated.

Although the above-mentioned threshold value of the number of times of failure is 3 and the upper limit is 200 yen/hr, both of these values may be other values. Also, the user may set these values.

As described above, according to the present embodiment, the printer 11 sends the connection request for receiving the provision of the image editing service to the server 13. When there is no response from the server 13, an inquiry is made to the search server 12 to obtain a search result from the search server 12, and then an inquiry is made to the server 14 which corresponds to the search result from the search server 12 and is different from the server 13. As a result, even when there is no response from the server 13 that provides the image edit service, the processing for receiving the image editing service can be continued. Moreover, when the image editing service is provided from the server 14, the URL of the server 14 is stored in the printer 11 as information of a secondary server (substitute server), and when the image editing service cannot be received from the server 13 again, the image editing service can be received by inquiring of the server 14, based on the stored information of the secondary server. As a result, the image editing service can be provided for a user without any delay, to thereby reduce the stress on the user.

Although the present embodiment is mainly directed to provision of the image editing service for editing image data, the type of data to be edited is not limited to image data, and character data, video data, other types of data may be edited.

In the present embodiment, it is assumed that the search server 12 and servers 13 to 17 are implemented by general-purpose personal computers. However, there are no particular limitations and may be implemented by mobile computers, or may be dedicated to the present invention. In short, any type of apparatus may be used as the servers insofar as they can form the server-client relationship in the Internet or a LAN.

Also, the printer 11 can be a type provided with a high function CPU, and then it can accomplish similar functions to those of the above-mentioned search server 12 and servers 13 to 17, or in other words, it can fulfill server or client functions in the Internet or a LAN.

Further, it is to be understood that an information processing apparatus that can fulfill server or client functions in the Internet or a LAN is not limited to the printer 11 and the present invention can be applied to other information processing apparatuses (scanner, computer, and others) other than the printer 11.

It is to be understood that the object of the present invention may also be accomplished by supplying a system or an apparatus with a storage medium (or recording medium) in which a program code of software which realizes the functions of the above described embodiment is stored, and causing a computer (or CPU or MPU) of the system or apparatus to read out and execute the program code stored in the storage medium.

In this case, the program code itself read out from the storage medium realizes the functions of the embodiment described above, and hence the program code and the storage medium in which the program code is stored constitute the present invention.

Further, it is to be understood that the functions of the above described embodiment may be accomplished not only by executing a program code read out by a computer, but also by causing an operating system (OS) or the like which operates on the computer to perform a part or all of the actual operations based on instructions of the program code.

Further, it is to be understood that the functions of the above-described embodiment may be accomplished by writing a program code read out from the storage medium, into a memory provided on an expansion board inserted into a computer or in an expansion unit connected to the computer and then causing a CPU or the like provided in the expansion board or the expansion unit to perform a part or all of the actual operations based on instructions of the program code.

Further, the above program has only to realize the functions of the above-described embodiment on a computer, and the form of the program may be an object code, a program executed by an interpreter, or script data supplied to an OS.

Examples of the storage medium for supplying the program include a floppy (registered trademark) disk, a hard disk, an optical disk, a magneto-optical disk, a CD-ROM, an MO, a CD-R, a CD-RW, a DVD (DVD-ROM, DVD-RAM, DVD-RW, DVD+RW), a magnetic tape, a nonvolatile memory card, and a ROM. Alternatively, the program may be supplied by downloading from another computer, a database, or the like, not shown, connected to the Internet, a commercial network, a local area network, or the like.

CROSS REFERENCE TO RELATED APPLICATION

This application claims priority from Japanese Patent Application No. 2003-206273 filed Aug. 6, 2003, which is hereby incorporated by reference herein.

What is claimed is:

1. An information processing method executed by at least one information processing apparatus, the information processing apparatus communicating with a plurality of servers and at least one search server, comprising:

a first search requesting step of requesting the search server to perform a first search for at least one of the servers for performing a desired data processing requested from the information processing apparatus;

a first receiving step of receiving a result of the first search showing a first server which is different from the search server;

a first data processing requesting step of requesting the first server to perform the desired data processing, wherein the first server can either accept the request or cannot accept the request to process the desired data processing;

a counting step of counting the number of times the first server rejects the request;

an inquiry-excluded server registering step of registering information indicating the first server as an inquiry-excluded server in the storage when the number of times is not less than a predetermined number of times;

a substitute server determination step of determining whether information indicating a substitute server for the first server is registered in a storage, when the first server cannot accept a request for performing the desired data processing from the information processing apparatus;

a second search requesting step of requesting the search server to perform a second search for at least one of the servers for performing the desired data processing, when the first server cannot accept a request for performing the desired data processing from the information processing apparatus, and it is determined by the substitute server determination step that information indicating a substitute server for the first server is not registered in the storage;

a second receiving step of receiving a result of the second search showing a second server which is different from the first server and from the search server;

a second server determination step of determining whether the second server can perform the desired data processing and satisfy a predetermined condition;

a registering step of registering information indicating the second server as a substitute server for the first server in the storage, while also retaining information indicating the first server in the storage, when it is determined by the second server determination step that the second server can perform the desired data processing and satisfy a predetermined condition; and a second data processing requesting step of requesting the second server to perform the desired data processing without requesting the search server to perform the second search requesting step, when the first server cannot accept the request for performing the desired data processing from the information processing apparatus, and it is determined by the substitute server determination step that the information indicating the second server as the substitute server is registered in the storage;

wherein said substitute server determination step comprises determining whether the information indicating the substitution server for the first server is registered in the storage without requesting the search server to perform the desired data processing, when the information indicating the first server shown due to the result of the first search is registered as the inquiry-excluded server in the storage.

2. An information processing method according to claim 1, wherein said registering step comprises registering the information indicating the second server as the substitute server in the storage when a use charge of the second server for performing the desired data processing is not more than a predetermined upper limit.

3. An information processing method according to claim 1, wherein the predetermined condition means that a use charge for a service of the second server is not more than a predetermined upper limit.

4. An information processing method according to claim 1, wherein the predetermined condition means that a use charge for a service of the second server is not more than that for a service of the first server.

5. A computer readable storage medium storing an information processing program that can be executed by an information processing apparatus communicating with a plurality of servers and at least one search server, comprising:

a first search requesting module for requesting the search server to perform a first search for at least one of the servers for performing a desired data processing requested from the information processing apparatus;

a first receiving module for receiving a result of the first search showing a first server which is different from the search server;

a first data processing module for requesting the first server perform the desired data processing, wherein the first server can either accept the request or cannot accept the request to process the desired data processing;

a counting module for counting the number of times the first server rejects the request;

an inquiry-excluded server registering module for registering information indicating the first server as an inquire-excluded server in the storage when the number of times is not less than a predetermined number of times;

a substitute server determination module for determining whether information indicating a substitute server for the first server is registered in a storage, when the first server cannot accept a request for performing the desired data processing from the information processing apparatus;

a second search requesting module for requesting the search server to perform a second search for at least one of the servers for performing the desired data processing, when the first server cannot accept a request for performing the desired data processing from the information processing apparatus, and it is determined by the substitute server determination module that information indicating a substitute server for the first server is not registered in a the storage;

a second receiving module for receiving a result of the second search showing a second server which is different from the first server and from the search server;

a second server determination module for determining whether the second server can perform the desired data processing and satisfy a predetermined condition;

a registering module for registering information indicating the second server as a substitute server for the first server in the storage, while also retaining information indicating the first server in the storage, when it is determined by the second server determination module that the second server can perform the desired data processing and satisfy a predetermined condition; and a second third data processing module for requesting the second server to perform the desired data processing without requesting the second search requesting module request the search server to perform the second search, when the first server cannot accept the request for performing the desired data processing from the information processing apparatus, and it is determined by the substitute server determination module that the information indicating the second server as the substitute server is registered in the storage;

wherein said substitute server determination module determines whether the information indicating the substitution server for the first server is registered in the storage without requesting the search server to perform the desired data processing, when the information indicating the first server shown due to the result of the first search is registered as the inquiry-excluded server in the storage.

6. A computer readable storage medium storing an information processing program according to claim 5, the program further comprising:

a counting module for counting a number of times the first server rejects the request; and an inquiry-excluded server registering module for registering information indicating the first server as an inquiry-excluded server in the storage when the number of times is not less than a predetermined number of times.

7. A computer readable storage medium storing an information processing program according to claim 5, wherein said registering module comprises registering the information indicating the second server as the substitute server when a use charge of the second server for performing the desired data processing is not more than a predetermined upper limit.

8. A computer readable storage medium storing an information processing program according to claim 5, wherein the predetermined condition means that a use charge for a service of the second server is not more than a predetermined upper limit.

9. An information processing apparatus which is capable of communicating with a plurality of servers and at least one search server, comprising:
- a storage;
- a first search requesting device that requests the search server to perform a first search for at least one of the servers for performing a desired data processing requested from the information processing apparatus;
- a first receiving device that receives a result of the first search showing a first server which is different from the search server;
- a first data processing device that requests the first server perform the desired data processing, wherein the first server can either accept the request or cannot accept the request to process the desired data processing;
- a counting device for counting the number of times the first server rejects the request;
- an inquiry-excluded server registering device for registering information indicating the first server as an inquire-excluded server in the storage when the number of times is not less than a predetermined number of times;
- a substitute server determination device that determines whether information indicating a substitute server for the first server is registered in the storage, when the first server cannot accept a request for performing the desired data processing from the information processing apparatus;
- a second search requesting device that requests the search server to perform a second search for at least one of the servers for performing the desired data processing, when the first server cannot accept a request for performing the desired data processing from the information processing apparatus, and it is determined by the substitute server determination device that information indicating a substitute server for the first server is not registered in a the storage;
- a second receiving device that receives a result of the second search showing a second server which is different from the first server and from the search server;
- a second server determining device that determines whether the second server can perform the desired data processing and satisfy a predetermined condition;
- a registering device that registers information indicating the second server as a substitute server for the first server in the storage, while also retaining information indicating the first server in the storage, when it is determined by the second server determination device that the second server can perform the desired data processing and satisfy a predetermined condition; and
- a second data processing device that requests the second server to perform the desired data processing without requesting the second search requesting device request the search server to perform the second search, when the first server cannot accept the request for performing the desired data processing from the information processing apparatus, and it is determined by the substitute server determination device that the information indicating the second server as the substitute server is registered in the storage;
- wherein said substitute server determination device determines whether the information indicating the substitution server for the first server is registered in the storage without requesting the search server to perform the desired data processing, when the information indicating the first server shown due to the result of the first search is registered as the inquiry-excluded server in the storage.

10. An information processing apparatus according to claim 9, further comprising:
- a counting device that counts a number of times the first server rejects the request; and
- an inquiry-excluded server registering device that registers information indicating the first server as an inquiry-excluded server in the storage when the number of times is not less than a predetermined number of times.

11. An information processing apparatus according to claim 9, wherein said registering device registers the information indicating the second server as the substitute server when a use charge of the second server for performing the desired data processing is not more than a predetermined upper limit.

12. An information processing apparatus according to claim 9, wherein the predetermined condition means that a use charge for a service of the second server is not more than that for a service of the first server.

* * * * *